United States Patent
Lehmann et al.

(10) Patent No.: US 12,169,437 B1
(45) Date of Patent: Dec. 17, 2024

(54) CLOUD SERVICE PROVIDER REQUEST RETRY FRAMEWORK

(71) Applicant: ServiceNow, Inc., Santa Clara, CA (US)

(72) Inventors: Yaron Lehmann, Tel Aviv (IL); Steven W. Francis, San Diego, CA (US); Sai Saketh Nandagiri, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/214,400

(22) Filed: Jun. 26, 2023

(51) Int. Cl.
*G06F 11/00* (2006.01)
*G06F 11/14* (2006.01)

(52) U.S. Cl.
CPC .... *G06F 11/1415* (2013.01); *G06F 2201/805* (2013.01)

(58) Field of Classification Search
CPC .............. G06F 11/1415; G06F 2201/805
USPC ...................................... 714/1–57
See application file for complete search history.

(56) References Cited

U.S. PATENT DOCUMENTS

| 9,021,109 B1 | 4/2015 | Gigliotti | |
| 2015/0254150 A1* | 9/2015 | Gordon | G06F 11/1402 714/6.3 |
| 2017/0374010 A1 | 12/2017 | Carr | |
| 2021/0157688 A1 | 5/2021 | Van Der Stockt | |
| 2022/0141085 A1* | 5/2022 | Singhal | H04L 67/1097 709/221 |
| 2023/0006902 A1 | 1/2023 | Mostov | |

FOREIGN PATENT DOCUMENTS

WO 2015168494 11/2015

* cited by examiner

*Primary Examiner* — Sarai E Butler
(74) *Attorney, Agent, or Firm* — Van Pelt, Yi & James LLP

(57) ABSTRACT

In various embodiments, a process for providing a cloud service provider request retry framework includes obtaining a request retry indicator that is associated with a cloud service provider, wherein the request retry indicator indicates a retry criterion that is based on a number of allowable discovery requests within a period of time. The process includes providing a discovery request to the cloud service provider; receiving an error response based on the discovery request, wherein the error response indicates the discovery request is unsuccessful based at least on the discovery request not satisfying the retry criterion; and determining a wait time based at least on the error response and the request retry indicator. The process includes retrying the discovery request according to the wait time.

20 Claims, 4 Drawing Sheets

CLOUD SERVICE PROVIDER REQUEST RETRY FRAMEWORK

BACKGROUND OF THE INVENTION

Discovery of cloud resources may include sending Hypertext Transfer Protocol (HTTP) requests to service providers to obtain cloud resource data. For example, cloud resources can be fetched from dedicated cloud service providers. Often, a cloud resource discovery system performs a multi-thread process, corresponding to a relatively large number of requests that are generated to fetch resource information. However, cloud service providers typically limit the number of requests that can be processed within a time window. When a client of a cloud service provider exceeds the rate limit, the request may be denied. Consequently, the cloud discovery resource system may be unable to fetch the resource information from the service provider, resulting in a limited number of discoverable cloud resources.

BRIEF DESCRIPTION OF THE DRAWINGS

Various embodiments of the invention are disclosed in the following detailed description and the accompanying drawings.

DETAILED DESCRIPTION

Figure 1:
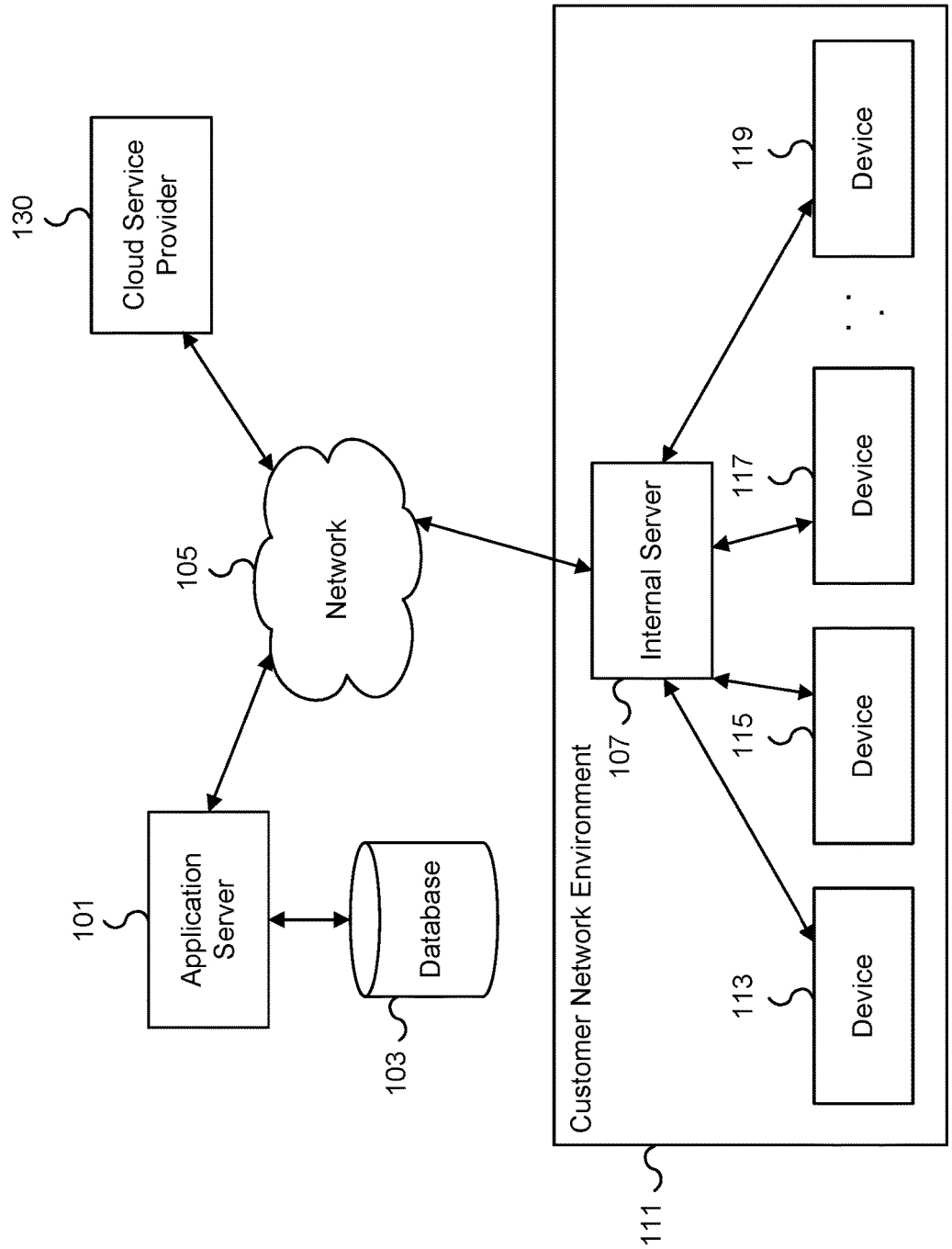
FIG. 1 is a block diagram illustrating a network environment for providing a cloud service provider request retry framework.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for providing a cloud service provider request retry framework are disclosed. The disclosed techniques provide strategies for retrying a request when the request has been denied by a responder such as a cloud service provider. As used herein, a "request" refers to any request made to another device or service. For example, the request may be an HTTP call to a cloud service provider. However, a cloud service provider may deny/throttle requests to protect its performance, e.g., if too many requests are made from the same credential or customer account.

A particular credential/account can be associated with a single machine or several machines. For example, a customer credential/account is used to access a platform such as the ServiceNow® platform. A particular customer may wish to discover cloud resources such as determining what is running on their private cloud. To do so, the platform uses the customer's credentials to make calls to fetch the requested information, as further described herein with respect to FIG. 1. Although the examples describe requests made to a cloud service provider associated with discovery, the disclosed techniques may be applied for any time of request retry situation where a request is denied and a requestor wishes to reattempt the request.

Conventionally, in response to a denied/throttled request, a requestor (such as a cloud discovery resource system) waits for a specified/hard-coded wait time and attempts to fetch the resources from a responder (such as a cloud service provider) again. This can lead to failures in retrieving the data from the provider. Even if a subsequent request is successful, the wait time might have been longer than necessary. A denied/throttled request can be handled in a better way by leveraging retry strategies customized for a responder/customer because responders may have different denial policies or behaviors and customers may have different preferences.

In various embodiments, a retry framework includes configuring a number of retries, maximum delay, initial delay, and/or other parameters based on the selected retry strategy for the provider. For example, capped exponential backoff is performed. As another example, a response header backoff is performed based on feedback provided by a service provider where the service provider provides information about how long to wait before making a further request. As yet another example, a custom backoff can be defined with appropriate logic to implement any retry strategy. For example, a custom backoff is defined via a script that can be run by a device such as a management, instrumentation, and discovery (MID) server as further described herein. In various embodiments, a rate limiter can be configured to limit the number of requests prior to making the request (e.g., prior to an initial "try" or a cycle before the "retry"). The disclosed techniques can be incorporated into a cloud request retry framework for cloud discovery to define retry configurations for cloud service providers.

In various embodiments, a denied/throttled request can be handled in a more effective way by leveraging retry strategies such as a capped exponential backoff approach, a response header approach, or a custom approach. A wait time or delay can be generated based on information provided by a cloud service provider such as a "Retry-After" or "Wait Time" parameter providing the time to wait before retrying the request.

In various embodiments, a cloud request retry framework (e.g., for cloud discovery) defines retry configurations for cloud providers. The framework may be helpful for users, such as discovery administrators in the context of cloud discovery. The framework may include options for a user to configure parameters such as a number of retries, maximum delay, initial delay, and others based on a desired retry strategy for the cloud service provider.

Figure 2:
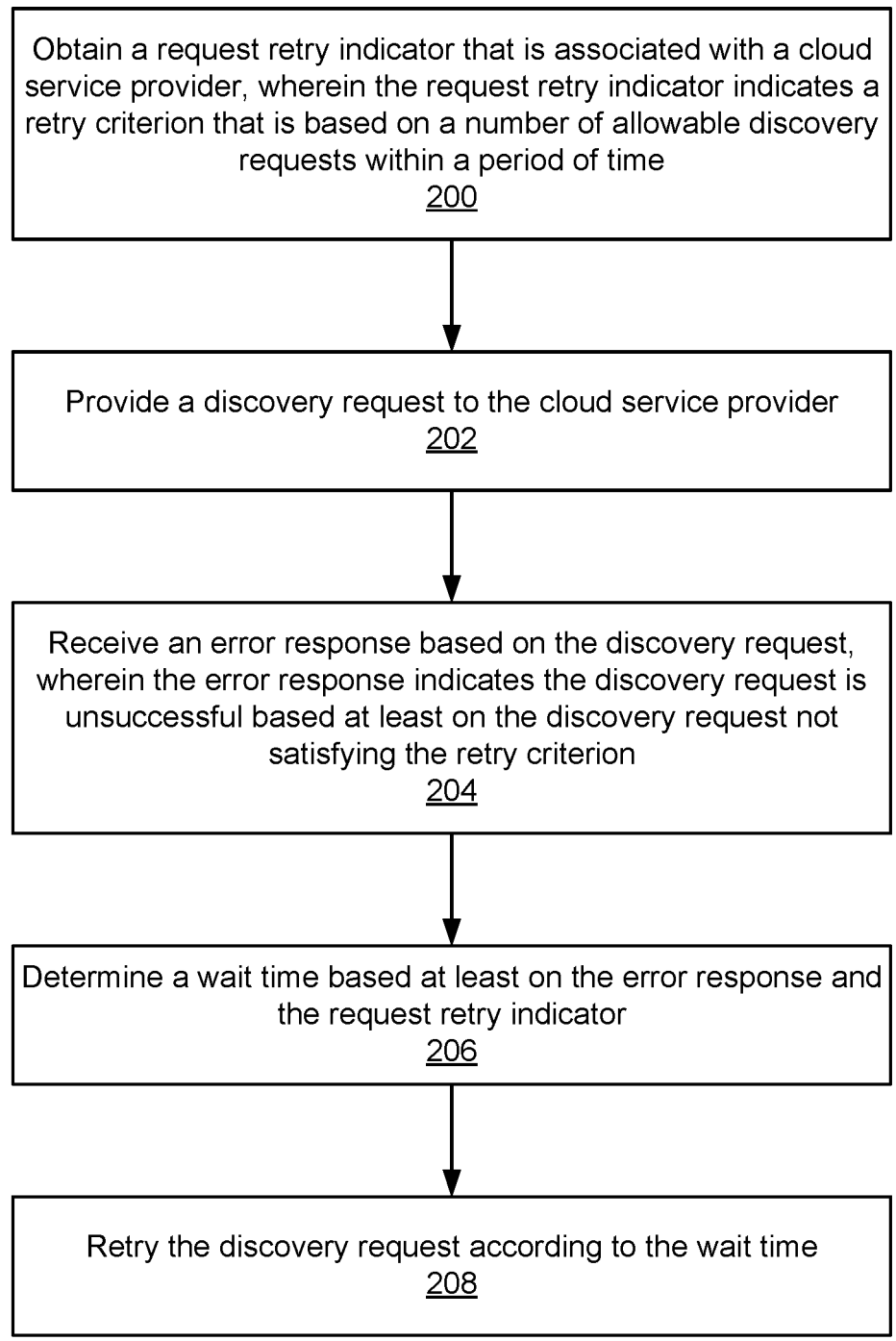
FIG. 2 is a flow diagram illustrating an embodiment of a process for providing a cloud service provider request retry framework.
Figure 3:
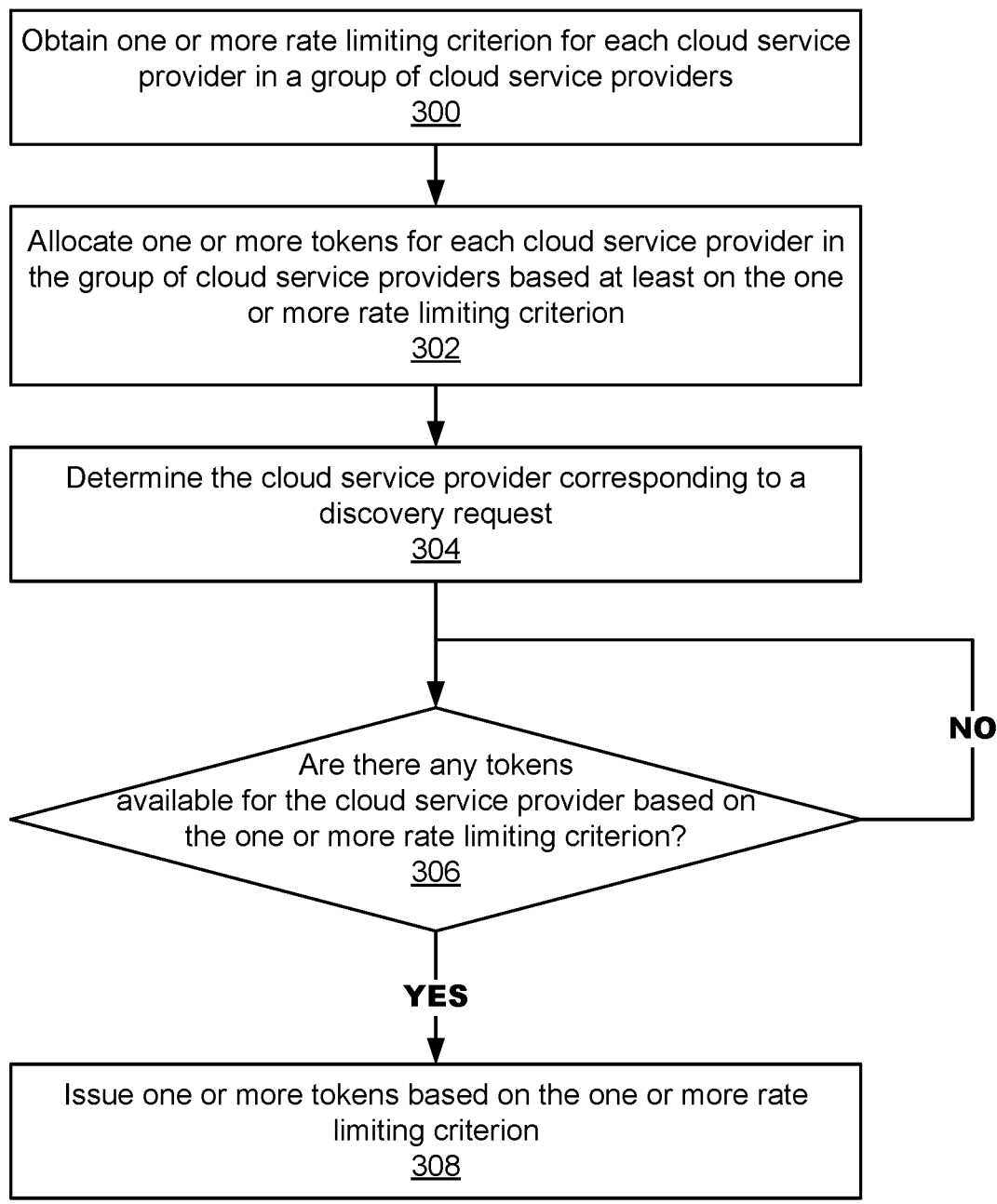
FIG. 3 is a flow diagram illustrating an embodiment of a process for providing a cloud service provider request retry framework including rate limiting.
Figure 4:
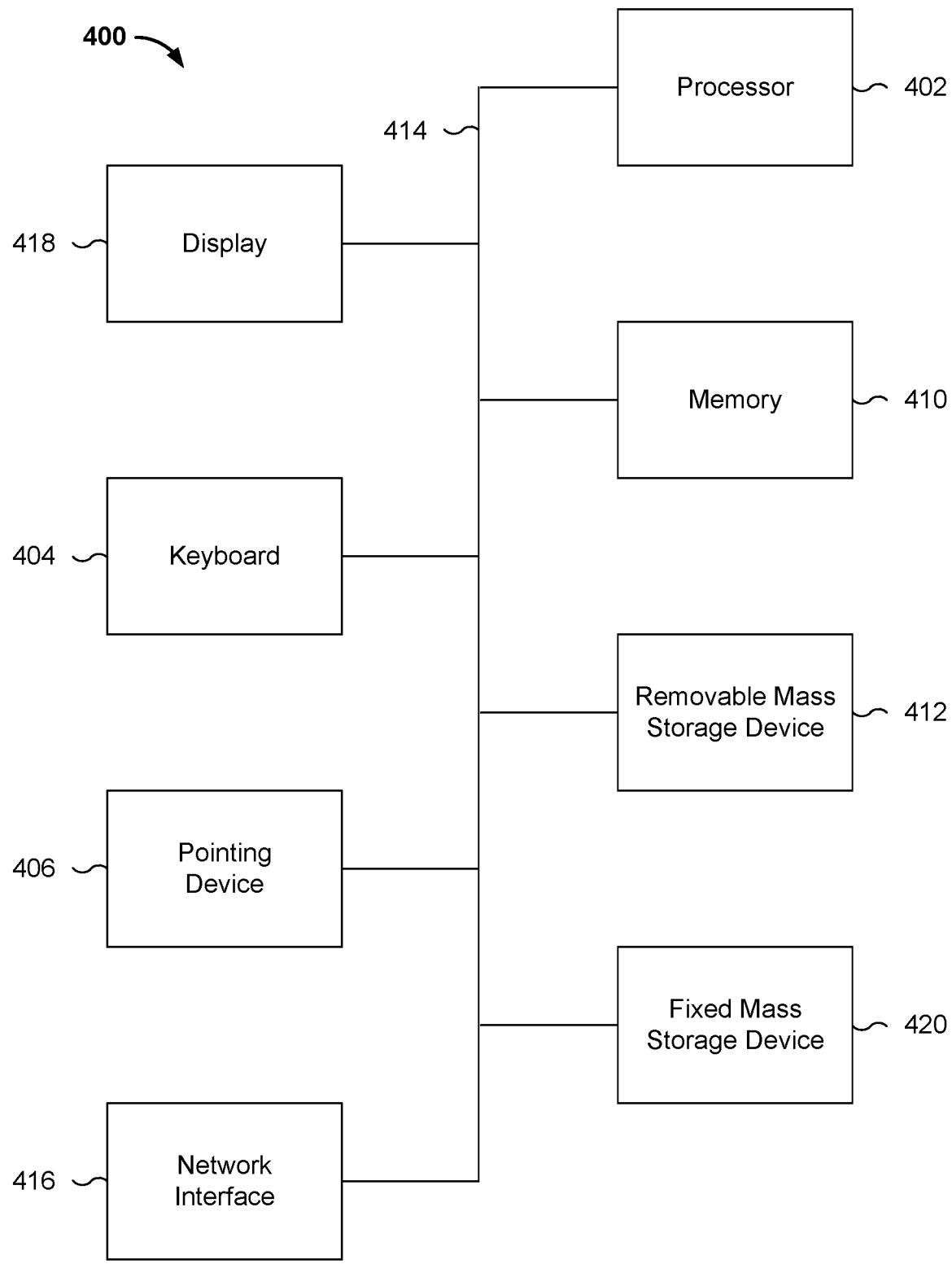
FIG. 4 is a functional diagram illustrating a programmed computer system for providing a cloud service provider request retry framework in accordance with some embodiments.

First, an example network environment is described (FIG. 1). Next, a process for providing a cloud service provider request retry framework is described (FIG. 2). Then, a process for providing a rate limit associated with retrying a request is described (FIG. 3). Finally, a system for providing a cloud service provider request retry framework is described (FIG. 4).

FIG. 1 is a block diagram illustrating a network environment for providing a cloud service provider request retry framework. In the example shown, application server 101 and customer network environment 111 are connected via network 105. Network 105 can be a public or private network. In some embodiments, network 105 is a public network such as the Internet. In various embodiments, application server 101 is a cloud-based application server that provides application services including an information technology operations management (ITOM) cloud service to determine metrics including resource expenditures of a digital service (sometimes simply referred to as "services") running within a customer network such as customer network environment 111. Application server 101 utilizes database 103, which is communicatively connected to application server 101. Application server 101 together with internal server 107, which is located within customer network environment 111, are part of a platform for discovering resources, services, devices, or the like within customer network environment 111. For example, using a cloud discovery service offered by application server 101, an administrator is presented with the discovered services running within customer network environment 111 that utilize one or more of the devices of customer network environment 111. In the example shown, example devices of customer network environment 111 include devices 113, 115, 117, and 119.

In some embodiments, database 103 is utilized by application server 101 to store information associated with requests made to the cloud service provider 130 as further described herein. For example, database 103 can be used to store discovery data or log data associated with services discovered within a customer network such as customer network environment 111. In some embodiments, database 103 is implemented using one or more databases such as one or more distributed database servers. For example, although shown as a single entity in FIG. 1, database 103 can be implemented as one or more distributed database components connected via network 105 to application server 101.

In some embodiments, database 103 further functions as a configuration management data base (CMDB) and is used at least in part for managing assets that are under the management of an organization, such as devices 113, 115, 117, and/or 119 of customer network environment 111. For example, each managed asset can be represented as a configuration item (CI) within database 103. In some embodiments, database 103 stores information related to managed assets, such as the hardware and/or software configuration of a computing device, as configuration items.

In some embodiments, application server 101 provides cloud-based services for managing information technology operations including providing a cloud service provider request retry framework. A service running on the customer's network environment can utilize entities (or devices) within the customer's network infrastructure, such as devices 113, 115, 117, and 119. The connections between processes running on these devices are discovered and used to discover the associated services running within customer network environment 111. Requests are made in order to discover connections and services, and sometimes the requests may be rejected or throttled. The disclosed retry techniques improve the success of requests. In various embodiments, application server 101 stores collected discovery service data in database 103.

In some embodiments, customer network environment 111 is an information technology network environment and includes multiple hardware devices including devices 113, 115, 117, and 119, as examples. Devices 113, 115, 117, and 119 correspond to hardware devices and each can be one of a variety of different hardware device types including networking equipment (such as gateways and firewalls), load balancers, servers including application servers and database servers among other servers, and other computing devices including employee laptops and desktops. Devices 113, 115, 117, and 119 are each configured with different hardware and software components, and they generally have the ability to accept or initiate connections between processes associated with the devices and in some instances with a network client located outside of customer network environment 111. For example, a process running on device 113 can establish a connection with a process running on device 115. In various embodiments, customer network environment 111 is connected to network 105. In the example shown, internal server 107, either alone or with the help of additional monitoring modules or agents, is capable of monitoring the processes and/or network connections associated with the devices within customer network environment 111, such as the processes running on devices 113, 115, 117, and 119 and their associated network connections. In various embodiments, the topology of customer network environment 111 can differ and the topology shown in FIG. 1 is just one simplified example.

In the example shown, internal server 107 is an intranet server of customer network environment 111 and the bi-directional connections between internal server 107 and devices 113, 115, 117, and 119 represent the ability for internal server 107 to monitor devices 113, 115, 117, and 119. An example of an internal server is a MID server by ServiceNowR. Depending on the network configuration, the components within customer network environment 111 including internal server 107 and devices 113, 115, 117, and 119 may have full or limited bi-directional or one-directional network connectivity to one another. Internal server 107 can be configured to receive and perform service discovery requests from application server 101 including requests to monitor the processes running and/or connections established within customer network environment 111. The results of the monitoring are sent back to application server 101 where they can be analyzed and evaluated to identify discovered services and determine metrics associated with the discovered services.

In some embodiments, the functionality of internal server 107 may be implemented by one or more additional devices including by customer devices such as a combination of one or more of devices 113, 115, 117, and/or 119. For example, monitoring agents can be installed on or in parallel to the respective devices to monitor processes and/or network connections associated with different devices. Depending on the network configuration of customer network environment 111, such as the ability to accept certain types of incoming network connections, at least a portion of the functionality performed at internal server 107 can be implemented by application server 101.

In various embodiments, the internal server 107 is a requestor that makes cloud discovery requests to a responder, here the cloud service provider 130. When a request is throttled, the cloud request executor (here, the internal server 107) fetches the retry configuration defined for the cloud service provider 130 to handle retries based on the retry strategy configured before returning the final response. As further described herein, retry strategies may include but are not limited to one or more of the following:

Exponential Backoff: configuration parameters may include max retries, base delay, max delay, additional delay window;

Response Header: configuration parameters may include max retries, header name, additional delay window;

Custom Strategy: an administrator is able to define a custom strategy where all the parameters are included in a script executable by the internal server.

Any retry strategy may add randomness (jitter) to the initial delay (base wait time). The randomness window may be bounded by the "additional_delay_window" value in a retry configuration. For example, if the initial delay generated by retry strategy is 500 milliseconds and "additional_delay_window" defined in the configuration is 1000 milliseconds, the final delay value returned could be between 500 and 1500 milliseconds, which is the sum of the initial delay and the random value.

At least a portion of the customer network environment 111 may be hosted by a cloud service provider. For example, the customer network environment may be included in a virtual network (e.g., virtual private cloud network) belonging to or otherwise associated with a particular customer.

Application server 101 and a customer network environment 111 may access one or more third party service providers 130 via network 105. In various embodiments, the cloud service provider is a dedicated/third-party service provider. For example, the cloud service provider is a third party different from the application server 101 and the customer (e.g., the entity that controls the customer network environment 111).

The disclosed request retry framework may be applied to any type of cloud service provider. In one aspect, the request retry approach can be adapted to a particular cloud service provider. Cloud service providers may vary from one provider to another in how requests are handled. For example, a cloud service provider denies a request and sends a wait time (e.g., amount of time to wait before retrying). As another example, a cloud service provider denies a request and asks the requester (or it may be otherwise known that the provider expects the requestor) to perform an exponential backoff. In various embodiments, the disclosed request retry techniques takes the information provided by the cloud service provider into consideration when determining a retry strategy.

Although single instances of some components have been shown to simplify the diagram of FIG. 1, additional instances of any of the components shown in FIG. 1 may exist. For example, application server 101 and database 103 may include one or more servers and/or may share servers. In some embodiments, database 103 may not be directly connected to application server 101. For example, database 103 and its components may be replicated and/or distributed across multiple servers and/or components. In some embodiments, components not shown in FIG. 1 may also exist. For example, network clients used to access application server 101 are not shown.

FIG. 2 is a flow diagram illustrating an embodiment of a process for providing a cloud service provider request retry framework. This process may be implemented by an application server such as application server 101 in cooperation with internal server 107 of FIG. 1 or a processor such as 402 of FIG. 4. In response to a denial of a request, the process retries the request including by tailoring a retry strategy to the characteristics of a cloud service provider. For example, the application server 101 determines the retry strategy and instructs the internal server 107 to carry out the strategy by executing a script.

In the example shown, the process begins by obtaining a request retry indicator that is associated with a cloud service provider, wherein the request retry indicator indicates a retry criterion that is based on a number of allowable discovery requests within a period of time (200). For example, if two retries are permitted per second, then the request retry indicator indicates that two discovery requests are allowed within a one-second period of time for a particular account.

The request retry indicator is associated with a retry framework, and may implement one or more retry strategies such as capped exponential backoff, response header backoff, or a custom backoff. A request retry indicator may be associated with one or more specific cloud service providers because each cloud service provider may respond in its own unique way to requests. The retry criterion includes one or more parameters for when or how to re-submit a request. Table 1 shows example parameters for request retries. A request retry indicator may include one or more of the examples shown in Table 1.

TABLE 1

| Column | Column name | Example Type | Description |
|---|---|---|---|
| Provider | provider | string | select the cloud provider (e.g., an identity of the cloud service provider) |
| Strategy | strategy | string | select the retry strategy |
| Script | script | string | name of mid script to be included in/used as a retry strategy |
| Base delay in ms | base_delay | number | base delay when using capped exponential backoff strategy (e.g., milli-seconds) |
| Max delay in ms | max_delay | number | max delay when using capped exponential backoff strategy (e.g., milli-seconds) |
| Additional delay window in ms | additional_delay_window | number | introduces randomness in the final delay (e.g., jitter) |
| Response codes | response_codes | string | HTTP codes to look for in response to identifying if a request is throttled |
| Response header | response_header | string | header used to extract the delay value when using response header strategy |
| Response header delay unit | response_header_delay_unit | string | delay unit of the response header (e.g., |

TABLE 1-continued

| Column | Column name | Example Type | Description |
|---|---|---|---|
| | | | seconds or milliseconds) |
| Max retries | max retries | number | maximum retries to fetch the data when a request is throttled |
| Active | active | boolean | activate/deactivate the retry configuration |

In various embodiments, the request retry indicator is included in a configuration that is stored in a MID server property. Each cloud service provider can have a respective configuration, and the configuration can be updated. The configuration can be stored in a JavaScript Object Notation (JSON) format, for example. Changes to the configuration are reflected in the MID server property and are synced to all the MID servers. In other words, the request retry indicator is included in a script and changes to the script are synchronized across servers. One benefit of this feature is that a user (e.g., a discovery administrator) can configure all of the retry configurations in one place instead of having to configure numerous MID properties individually.

For example, to implement a capped exponential backoff strategy, the following parameters may be used. Strategy="capped_exponential_backoff", response_codes=400, max_retries=5, base_delay=500, max_delay=10000, and additional_delay_window=1500. These parameters mean that in response to error code 400, the process will attempt five retries with a base delay of 500 ms, exponentially increasing to a cap of 10000 ms using a delay window of 1500 ms.

As another example, to implement a capped exponential backoff strategy the following parameters may be used. Response_codes=429 or 400, max_retries=5, base_delay=1000, max_delay=10000, and additional_delay_window=1500. These parameters mean that in response to error code 429 or 400, the process will attempt five retries with a base delay of 1000 ms, exponentially increasing to a cap of 10000 ms using a delay window of 1500 ms.

The parameters provided are merely exemplary and not intended to be limiting as other parameters may be used to implement other desired behavior. In various embodiments, all of the properties used by the retry framework are configurable. Reasonable default values are provided for all of the fields, and the values can be adjusted or customized. For example, if a user indicates that they want to create a new exponential backoff strategy for a particular cloud service provider, then default values to carry out the strategy may be automatically selected and the user is provided with the option to further adjust the default values.

The process provides a discovery request to the cloud service provider (202). Referring briefly to FIG. 1, the internal server 107 makes a discovery request (sometimes simply called a "request") to the cloud service provider 130. A particular account may be shared across several different internal servers. A particular account can configure different internal servers, e.g., selecting three internal servers to perform discovery. Consequently, when cloud discovery is performed, three internal servers are making requests to the cloud service provider.

In various embodiments, a discovery request may be included in a pattern. A pattern can be used to find configuration items belonging to a service and connections between the CIs. A pattern refers to a sequence of commands whose purpose is service mapping, detecting attributes of a configuration item and its outbound connections, among other things.

The process receives an error response based on the discovery request, wherein the error response indicates the discovery request is unsuccessful based at least on the discovery request not satisfying the retry criterion (204). The error response is received from the cloud service provider in response to a request. The cloud service provider may provide a response with error information as a way to throttle requests, enhance security, or otherwise manage performance. In various embodiments, the error response includes a header and body, where the header may include information about expected retry characteristics as further described herein.

The error response indicates the unsuccessful discovery request based at least on the discovery request exceeding the number of allowable discovery requests within a period of time. For example, if a particular cloud service provider can only accept up to two requests per second, upon receiving the third request in the same time period, the cloud service provider sends an error response back to the requester indicating that the request is unsuccessful. In various embodiments, the error response includes a response code. The response code can indicate the type of error, and may be custom or standardized such as HTTP response status codes as further described herein.

In various embodiments, the process measures or collects one or more metrics associated with the discovery request and/or included in the error response. Table 2 shows example retry metrics.

| Column | Column name | Example Type | Description |
|---|---|---|---|
| Discovery status | discovery_status | reference | Related discovery status record |
| Output Ecc queue | ecc_queue | reference | Related output ecc queue of a HorizontalDiscoveryProbe (A probe explores or investigate CIs in a customer network environment) |
| Provider | provider | string | cloud service provider |
| Status | status | string | Success/failure |
| Url | url | string | Endpoint details |
| Pattern | pattern | string | Name of the pattern |
| Total delay | total_delay | string | Total time (e.g., milliseconds) to execute the request |

In various embodiments, a MID server log can record response and other activity associated with the cloud service provider. For example, when the MID server log is set to debug mode, a MID server agent logs details generated from the cloud request executor and retry strategy classes. In various embodiments, a log is maintained only for failed requests or for both successful and failed requests. For example, when a request gets denied or otherwise not allowed, metrics and other characteristics are logged. Example metrics include a particular request is denied x number of times, wait time prior to failure, etc.

In various embodiments, if a request is unsuccessful but there is no recognizable error response, then the response is returned, marked, or canceled because it is not considered to be denied. In other words, a response is considered to be an error response if it includes a response code.

The process determines a wait time based at least on the error response and the request retry indicator (206). The wait time can be based on factors such as the response code, header information, etc. In various embodiments, different wait times can be configured for different types of responses, as indicated by the response code. Response codes are standard codes included in the response from the cloud service provider such as 429 (too many requests) or 404 (not found). A particular wait time can be used for one or more response codes, as determined by looking up the wait time for the response code in a mapping table.

For example, to implement a capped exponential backoff, the process determines the starts with an initial wait time based on a cloud service provider. For example, a particular cloud service provider may inform the requestor or otherwise is known to expect an exponential backoff starting at two second. The process waits two seconds then tries again. If the retry fails, then the process waits four seconds, and so on. Thus, the wait time increases exponentially until an upper limit is reached.

As another example, to implement a response header backoff, the process parses the response from the cloud service provider to determine the wait time. Typically, a cloud service provider can share a desired wait time by providing this information in its response such as in the header of the response. In various embodiments, the process will use the desired wait time provided by the cloud service provider or can modify the wait time to improve performance. One example of modifying the wait time provided by the cloud service provider is to add some jitter to the wait time as further described herein. This can be beneficial because it prevents clashes between requests.

As yet another example, to implement a custom backoff, the process allows a user to customize any of the parameters associated with the retry. The user can also program a script to implement any backoff strategy.

The process retries the discovery request according to the wait time (208). For example, if the wait time is 0.5 seconds, then the request is re-submitted after 0.5 seconds. In various embodiments, retrying the discovery request according to the wait time satisfies the retry criterion. Experiments using the disclosed techniques show that there is a high rate of receiving a successful response compared with conventional retry strategies.

In various embodiments, determining the wait time includes dynamically determining the wait time based on the cloud service provider, and retrying the discovery request according to the wait time includes waiting until the wait time has elapsed before retrying the discovery request. In other words, in contrast with conventional techniques where wait times are typically hardcoded and/or the same for different cloud service providers, the disclosed techniques tailor the wait time to a particular cloud service provider.

In various embodiments, a "max retries" parameter defines the absolute number of retries permitted. If the current retry is less than the maximum, then a retry will be attempted according to the techniques disclosed herein. If the current retry exceeds the maximum, then the retry will be abandoned. In other words, the process may terminate after 204 without proceeding to 206 and 208 if the max retries has been exceeded.

In various embodiments, a wait time for reattempting a request includes a component called jitter. Jitter is a random value (time) added onto the base wait time. Adding jitter may be beneficial because it prevents collisions in a multi-threaded process. Without adding the jitter, collisions may occur. Referring briefly to FIG. 1, in this system, multiple internal servers 107 (requestors) may be interacting with the cloud service provider 130 at the same time, so concurrent requests may be made. If two or more requestors receive an error response at the same time, they will retry the request at the same time, which may lead to the same error because too many requests are being made simultaneously. The random value (jitter window) added to the base wait time is independent of the base wait time. For example, if the wait time is 2 seconds, and the jitter window is 1.5 seconds, then any value from 0 to 1.5 seconds may be added to the base wait time. Consequently, when many requestors are retrying, the retries get distributed over time and collisions are minimized or avoided.

In various embodiments, prior to providing a discovery request to a cloud service provider (e.g., 202) the process determines whether/when to make the discovery request. In other words, rather than being reactive (retrying based on a certain strategy), the process performs rate limiting, which may further improve efficiency and the likelihood of receiving successful responses to requests.

FIG. 3 is a flow diagram illustrating an embodiment of a process for providing a cloud service provider request retry framework including rate limiting. This process may be implemented by an application server such as application server 101 in cooperation with internal server 107 of FIG. 1 or a processor such as 402 of FIG. 4. For example, the application server determines the retry strategy and rate limits and instructs the internal server 107 to carry out the strategy by executing a script. This process may be performed as part of another process such as prior to 202 of FIG. 2. In various embodiments, a discovery request can be provided to the cloud service provider (202) only if a token is issued at 308 (e.g., the process of FIG. 3 completes).

In various embodiments, rate limiting is implemented using a token/counter issuing process where a discovery request can be made to a cloud service provider only if a request is accompanied by a valid token. The number of tokens provided can be based on the cloud service provider. The number of tokens is user-configurable or pre-configurable, for example being based on a cloud service provider's characteristics. Suppose a cloud service provider typically permits two requests per second. The process would issue no more than two tokens per second, which means that at most two requests are made to the cloud service provider per second.

In the example shown, the process begins by obtaining one or more rate limiting criterion for each cloud service provider in a group of cloud service providers (300). The rate limiting criterion can be the number of requests permitted per time period, and can be based on observed behavior of a cloud service provider or information provided by the cloud service provider. The rate limiting criterion can be indicated in a field by an administrator (or otherwise pre-configured). For example, for a particular cloud service provider, the rate limit is set to two requests per second for a given account.

The process allocates one or more tokens for each cloud service provider in the group of cloud service providers based at least on the one or more rate limiting criterion (302). The number of tokens allocated to a particular cloud service provider controls the rate at which the cloud service provider is queried, because a request is allowed only if accompanied by/presented with a token. Referring to the example in which a cloud service provider is able to accommodate up to two request per second, two tokens are issued. Within a one-second period, a first request can be made with the first token, and a second request can be made with the second token. After the two tokens are used up, no other requests are permitted to be made to the cloud service provider within the one-second period. The allocation of tokens is for a specific time period, so when the time period expires, a new allocation is made. For example, if two requests are allowed per second, then two tokens are allocated for the current one-second period. When the one-second period expires, then two new tokens are allocated for the next one-second period.

The process determines the cloud service provider corresponding to a discovery request (304). An example of a discovery request is described with respect to 202. A discovery request corresponds to a request to be made to the cloud service provider and is subject to rate limiting, to improve the likelihood of receiving a successful response to the request or performance. The process identifies the cloud service provider associated with the discovery request in order to enforce the appropriate rate limit. For example, the process determines that a discovery request is to be made to the particular cloud service provider that permits two requests per second.

The process determines whether there are any tokens available for the cloud service provider based on the one or more rate limiting criterion (306). The process waits for the period to expire to attempt to obtain another token. For example, if there are two tokens issued per second and none are currently available, the process waits for the one-second period to expire, and attempts to obtain a token. In various embodiments, when a condition is met (e.g., waiting for a threshold period of time) and no tokens are available, the process ends.

Otherwise, if one or more tokens are available, the process proceeds to issue one or more tokens based on the one or more rate limiting criterion (308). Referring again to the example of the particular cloud service provider that allows up to two requests to be made per second, suppose a request has already been made within the one-second period. One token would be remaining, and that token would be issued, allowing the request to be made.

In various embodiments, the rate limiting can be performed adaptively. A number of tokens allocated for each cloud service provider is based at least on a number of prior requests processed over a predetermined period of time. For example, if requests are processed successfully, then the number of tokens can be increased. Suppose continuous success is observed over a period of time, e.g., requests are not getting denied by the provider. The rate limit can be increased to three requests per second. If requests continue to be successful, then the rate limit can be further increased. Otherwise, the rate limit can be decreased. The period of time during which requests are observed to determine whether there has been continuous success may vary from cloud service provider to cloud service provider. For example, for a particular cloud service provider, success may be defined as two requests per second, and this rate may be encoded in the configuration. In various embodiments, if the success rate is high (above a threshold, e.g., 90% of requests are successful), the process increases the rate limit until a threshold is reached. For example, if two requests per second are successful, then the rate limit may be gradually increased up to 10 requests per second.

Although the examples refer to tokens, this is merely exemplary and not intended to be limiting as similar mechanisms such as a permit or ticket may be used. Although the examples refer to cloud requests, this is merely exemplary and not intended to be limiting. For example, the disclosed techniques apply to any request such as any HTTP call.

FIG. 4 is a functional diagram illustrating a programmed computer system for providing a cloud service provider request retry framework in accordance with some embodiments. As will be apparent, other computer system architectures and configurations can be used to provide a cloud service provider request retry framework. Computer system 400, which includes various subsystems as described below, includes at least one microprocessor subsystem (also referred to as a processor or a central processing unit (CPU)) 402. For example, processor 402 can be implemented by a single-chip processor or by multiple processors. In some embodiments, processor 402 is a general purpose digital processor that controls the operation of the computer system 400. Using instructions retrieved from memory 410, the processor 402 controls the reception and manipulation of input data, and the output and display of data on output devices (e.g., display 418). In some embodiments, processor 402 includes and/or is used to execute/perform the processes described herein with respect to FIGS. 2 and 3.

Processor 402 is coupled bi-directionally with memory 410, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 402. Also as is well known in the art, primary storage typically includes basic operating instructions, program code, data and objects used by the processor 402 to perform its functions (e.g., programmed instructions). For example, memory 410 can include any suitable computer-readable storage media, described below, depending on whether, for example, data access needs to be bi-directional or uni-directional. For example, processor 402 can also directly and very rapidly retrieve and store frequently needed data in a cache memory (not shown).

A removable mass storage device 412 provides additional data storage capacity for the computer system 400, and is coupled either bi-directionally (read/write) or uni-directionally (read only) to processor 402. For example, storage 412 can also include computer-readable media such as magnetic tape, flash memory, PC-CARDS, portable mass storage devices, holographic storage devices, and other storage devices. A fixed mass storage 420 can also, for example, provide additional data storage capacity. The most common example of mass storage 420 is a hard disk drive. Mass storage 412, 420 generally store additional programming instructions, data, and the like that typically are not in active use by the processor 402. It will be appreciated that the information retained within mass storage 412 and 420 can be incorporated, if needed, in standard fashion as part of memory 410 (e.g., RAM) as virtual memory.

In addition to providing processor 402 access to storage subsystems, bus 414 can also be used to provide access to other subsystems and devices. As shown, these can include a display monitor 418, a network interface 416, a keyboard 404, and a pointing device 406, as well as an auxiliary input/output device interface, a sound card, speakers, and other subsystems as needed. For example, the pointing device 406 can be a mouse, stylus, track ball, or tablet, and is useful for interacting with a graphical user interface.

The network interface 416 allows processor 402 to be coupled to another computer, computer network, or telecommunications network using a network connection as shown. For example, through the network interface 416, the processor 402 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 402 can be used to connect the computer system 400 to an external network and transfer data according to standard protocols. For example, various process embodiments disclosed herein can be executed on processor 402, or can be performed across a network such as the Internet, intranet networks, or local area networks, in conjunction with a remote processor that shares a portion of the processing. Additional mass storage devices (not shown) can also be connected to processor 402 through network interface 416.

An auxiliary I/O device interface (not shown) can be used in conjunction with computer system 400. The auxiliary I/O device interface can include general and customized interfaces that allow the processor 402 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 4 is but an example of a computer system suitable for use with the various embodiments disclosed herein. Other computer systems suitable for such use can include additional or fewer subsystems. In addition, bus 414 is illustrative of any interconnection scheme serving to link the subsystems. Other computer architectures having different configurations of subsystems can also be utilized.

The disclosed cloud service provider request retry techniques have many advantages over conventional techniques. In one aspect, the retry mechanism is robust, meaning that the likelihood of successfully obtaining a response (e.g., fetching cloud resources for cloud discovery) is significantly higher. In experiments, by using the disclosed techniques, requests have a 100% success rate. By contrast, the failure rate of conventional techniques is relatively high (e.g., over 90%).

In another aspect, processing time/latency is reduced and user experience is improved. Returning to the example of cloud discovery, discovery duration time is reduced because requests are retried flexibly or intelligently based on cloud service provider expected behavior or responses. In other words, the wait time is tailored to the cloud service provider and neither too short nor too long. By contrast, conventional techniques may wait for a hard coded wait time for each retry, which cumulatively results in a longer total wait before a successful response is received, if at all.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining a request retry indicator that is associated with a cloud service provider, wherein the request retry indicator indicates a retry criterion that is based on a number of allowable discovery requests within a period of time;
    providing a discovery request to the cloud service provider;
    receiving an error response based on the discovery request, wherein the error response indicates the discovery request is unsuccessful based at least on the discovery request not satisfying the retry criterion;
    determining a wait time based at least on the error response and the request retry indicator; and
    retrying the discovery request according to the wait time.

2. The method of claim 1, wherein the request retry indicator includes at least one of an identity of the cloud service provider or a retry strategy.

3. The method of claim 1, wherein the request retry indicator includes at least one of a response code or a response header.

4. The method of claim 1, wherein the request retry indicator includes at least one parameter associated with a capped exponential backoff.

5. The method of claim 1, wherein the request retry indicator includes at least one parameter associated with a response header backoff.

6. The method of claim 1, wherein the retry criterion includes the number of allowable discovery requests within the period of time for a specific account.

7. The method of claim 1, wherein the error response indicates the unsuccessful discovery request based at least on the discovery request exceeding the number of allowable discovery requests within the period of time.

8. The method of claim 1, wherein the error response includes a response code.

9. The method of claim 8, determining the wait time is based at least on the response code.

10. The method of claim 1, wherein retrying the discovery request according to the wait time satisfies the retry criterion.

11. The method of claim 1, wherein:
    determining the wait time includes dynamically determining the wait time based on the cloud service provider; and
    retrying the discovery request according to the wait time includes waiting until the wait time has elapsed before retrying the discovery request.

12. The method of claim 1, wherein the request retry indicator is included in a script and changes to the script are synchronized across a plurality of servers.

13. The method of claim 1, wherein the wait time is based at least on a random time period added onto a base wait time.

14. The method of claim 1, further comprising, prior to providing the discovery request to the cloud service provider:

obtaining one or more rate limiting criterion for each cloud service provider in a group of cloud service providers;

allocating one or more tokens for each cloud service provider in the group of cloud service providers based at least on the one or more rate limiting criterion;

determining the cloud service provider corresponding to a discovery request;

determining that there are tokens available for the cloud service provider based on the one or more rate limiting criterion; and in response to a determination that there are tokens available, issuing one or more tokens based on the one or more rate limiting criterion.

15. The method of claim 1, wherein a number of tokens allocated for each cloud service provider is based at least in part on a number of prior requests processed over a predetermined period of time.

16. A system, comprising:

a processor configured to:

obtain a request retry indicator that is associated with a cloud service provider, wherein the request retry indicator indicates a retry criterion that is based on a number of allowable discovery requests within a period of time;

provide a discovery request to the cloud service provider;

receive an error response based on the discovery request, wherein the error response indicates the discovery request is unsuccessful based at least on the discovery request not satisfying the retry criterion;

determine a wait time based at least on the error response and the request retry indicator; and retry the discovery request according to the wait time; and a memory coupled to the processor and configured to provide the processor with instructions.

17. The system of claim 16, wherein the request retry indicator includes at least one of an identity of the cloud service provider or a retry strategy.

18. The system of claim 16, wherein:

determining the wait time includes dynamically determining the wait time based on the cloud service provider; and retrying the discovery request according to the wait time includes waiting until the wait time has elapsed before retrying the discovery request.

19. The system of claim 16, wherein the processor is further configured to:

obtain one or more rate limiting criterion for each cloud service provider in a group of cloud service providers;

allocate one or more tokens for each cloud service provider in the group of cloud service providers based at least on the one or more rate limiting criterion;

determine the cloud service provider corresponding to a discovery request;

determine that there are tokens available for the cloud service provider based on the one or more rate limiting criterion; and in in response to a determination that there are tokens available, issue one or more tokens based on the one or more rate limiting criterion.

20. A computer program product embodied in a non-transitory computer readable medium and comprising computer instructions for:

obtaining a request retry indicator that is associated with a cloud service provider, wherein the request retry indicator indicates a retry criterion that is based on a number of allowable discovery requests within a period of time;

providing a discovery request to the cloud service provider;

receiving an error response based on the discovery request, wherein the error response indicates the discovery request is unsuccessful based at least on the discovery request not satisfying the retry criterion;

determining a wait time based at least on the error response and the request retry indicator; and retrying the discovery request according to the wait time.

* * * * *